United States Patent [19]

Blattermann et al.

[11] 4,425,995

[45] * Jan. 17, 1984

[54] COVER BELT CONVEYOR

[75] Inventors: Karl-Günther Blattermann, Hamburg-Rahlstedt; Günter Neuhaus, Hamburg; Güther Nolte, Moers, all of Fed. Rep. of Germany

[73] Assignee: Conrad Scholtz AG, Hamburg, Fed. Rep. of Germany

[*] Notice: The portion of the term of this patent subsequent to Jun. 16, 1995 has been disclaimed.

[21] Appl. No.: 273,249

[22] Filed: Jun. 12, 1981

Related U.S. Application Data

[63] Continuation-in-part of Ser. No. 78,904, Sep. 25, 1979, Pat. No. 4,273,238.

[30] Foreign Application Priority Data

Sep. 26, 1978 [DE] Fed. Rep. of Germany ....... 2841795
Sep. 26, 1979 [EP] European Pat. Off. ........ 79103655.1

[51] Int. Cl.³ ............................................. B65G 15/14
[52] U.S. Cl. .................................... 198/605; 198/626
[58] Field of Search .............. 198/604, 605, 626, 627, 198/628

[56] References Cited

U.S. PATENT DOCUMENTS 4,273,238 6/1981 Blattermann ....................... 198/605

FOREIGN PATENT DOCUMENTS

2519447 11/1976 Fed. Rep. of Germany ...... 198/605
2841795 4/1980 Fed. Rep. of Germany ...... 198/626

Primary Examiner—Jeffrey V. Nase
Attorney, Agent, or Firm—Bell, Seltzer, Park & Gibson

[57] ABSTRACT

A cover belt conveyor in which each of two conveyor belts have lateral corrugated edges or waved ridges of a substantially common height. The conveyor belts are mutually supported on the heads of the waved ridges to form a large conveying space therebetween. By the provision of interengaging profile knobs at the waved ridges which interengage like meshing teeth, engagement of the conveyor belts is maintained without the need for drums or rollers pressing the two belts against each other.

7 Claims, 7 Drawing Figures

COVER BELT CONVEYOR

FIELD AND BACKGROUND OF INVENTION

This application is a continuation-in-part of prior United States application Ser. No. 78,904 filed Sept. 25, 1979, and now U.S. Pat. No. 4,273,238.

This invention relates to a cover belt conveyor, in particular for steep conveyance of granular material and the like.

Cover belt conveyors are known, for instance, from German Pat. No. 936 918. In that case the closure strips are relatively flat sectional strips formed integral with a conveyor belt and provided with zones which are arranged to differ in pairs and at which zones the strips enter into mutual engagement in closed condition, i.e. when passing through the conveyor path. At the locations where the cover belt is returned, the sectional strips of the cover belt are bent open and, at the same time, deformed considerably so as to release the sectional strips from the carrier belt. Due to the relatively great elastic deformation which the sectional strips experience for opening and closing of the longitudinal marginal closure, such conveyor belts are subject to heavy wear. Furthermore, the configuration of the closure strips of this known cover belt conveyor provokes additional wear during the unavoidable relative movements longitudinally of the conveyor belt. The conveyor space available is very small with this known cover belt conveyor because of the low height of the sectional closure strips. Cover belt conveyors of this type are not widely used.

German Offenlegungsschrift No. 25 19 447 discloses a cover belt conveyor having two conveyor belts which are provided with corrugated edges of the same height, positioned parallel to each other in pairs at the longitudinal margins and, if desired, having such a height that they define a very large conveyor space together with the conveyor belts. The conveyor space of this known cover belt conveyor also is sealed satisfactorily because the head of each corrugated edge touches the respective other conveyor belt, by virtue of which the conveyor space is sealed at both sides in the manner of a labyrinth packing. However, the seal tightness is maintained only as long as both conveyor belts each remain in contact with the corrugated edges of the other conveyor belt. The centrifugal forces generated in curved conveyor paths or possible spillage of material may cause preliminary lift off of the conveyor belts from each other, unless relatively expensive contact pressure rollers are provided.

BRIEF DESCRIPTION OF INVENTION

It is the object of this invention to provide a cover belt conveyor which has large conveying space between the two conveyor belts and which remains tightly closed even under the most adverse conditions.

This object is met, in accordance with this invention, by a cover belt conveyor in which two conveyor belts, i.e. the carrier belt as well as the cover belt, have lateral corrugated edges or waved ridges of the same height, and both conveyor belts are mutually supported on the heads of these waved ridges. Thus a large conveyor space is formed due to the relatively great possible height of the waved ridges. At the same time, excellent sealing of the conveyor space at the side-by-side pairs of waved ridges is obtained by virtue of profile knobs at the waved ridges facing each other and being interengaged like meshing teeth and holding the waved ridges with their heads pressed into contact against the respective other conveyor belt. In this manner a steep or even vertical conveyance is possible without the need for drums or rollers pressing the two belts against each other resulting in low costs and a low weight of the whole system. The belts are prevented from separating and thereby opening the conveyor space even under very unfavorable conditions, such as under the influence of great centrifugal forces on the outer conveyor belt in a curved conveyor path. Tests have shown that, with the cover belt conveyor according to the invention, the conveyor space is sealed so tightly that even with the finest dusty material practically no undesired leakage of material occurs.

The closing and opening of the conveyor space at a feeding station and a discharge station, respectively, are effected in such manner with the cover belt conveyor of this invention that practically no wear occurs since the profile knobs at the sides of the waved ridges gradually become engaged and disengaged like the flanks of gear teeth without requiring any great elastic deformation of the belt. A slight tilting movement of the outer waved ridges, with respect to the conveyor space, positioned at the cover belt is quite sufficient. And this in turn can be achieved easily by giving the cover belt in its marginal zones a slight negative cradle shape.

The terms carrier belt and cover belt as used here refer to the orientation of the belts at the loading station. In the case of cover belt conveyors which follow a certain conveyor path, e.g. a C-shaped conveyor path, the functions of carrier and cover belt become exchanged in the course of the conveyor path. The carrier belt at the loading station becomes the cover belt at the discharge station.

The lateral tilting movement of the waved ridges of the cover belt for engagement and disengagement of the profile knobs or locking and unlocking of the pairs of waved ridges is effected conveniently and at little mechanical expenditure by means of conically tapering return drums. By virtue of its tension the cover belt conforms to outwardly conically tapering marginal zones of a return drum so that its waved ridges tilt toward the outside. At the transition from the return drum to the conveyor path, the marginal areas of the cover belt move back into flat position thus effecting automatic locking of the pairs of waved ridges. If desired, this process may be enhanced by a contact pressure roller disposed directly behind the return drum. The unlocking ahead of the unloading station is effected in reverse order. If the cover belt runs with upstanding waved ridges upstream of the discharge station, the tilting movement is promoted by the weight of the waved ridges which automatically press the marginal areas of the cover belt down. The natural elongation of the waved ridges in the head area, when running around the return drum, likewise has favorable effect on the locking and unlocking of the pairs of waved ridges.

In a preferred embodiment of the cover belt conveyor of this invention the profile knobs have a length in the longitudinal direction of the conveyor belt which is greater than half the spacing between crests in the waved ridge, and preferably approximately 57 percent to 60 percent of such spacing. This guarantees that each profile knob always finds support in one or two profile knobs of the adjacent waved ridges, whatever the relative positions between cover belt and carrier belt. This safeguards the absolutely tight sealing effect along the pairs of waved ridges.

The degree of coherence obtained between pairs of waved ridges depends on the number of rows of profile knobs and also on the height of the individual profile knobs. A constant center spacing between the individual rows of profile knobs has proved to be especially convenient. This means that the number of rows grows as the height of the waved ridges increases. The height of the profile knobs should be adapted to envisaged stress during conveyor operation. Preferably, the profile knobs are formed integrally with their waved ridge. This may be realized, for example, by vulcanizing them simultaneously with the waved ridge in a correspondingly shaped mold.

Inasmuch as the inventive concept described above is embodied independently, the subject matter of the invention also is a conveyor belt itself. The same embodiments as explained for the profile knobs of the cover belt conveyor and to be derived as described above also are advantageous for the conveyor belt.

BRIEF DESCRIPTION OF DRAWINGS

The invention and further advantageous details thereof will be described further below, by way of example, with reference to the accompanying diagrammatic drawings which show embodiments and in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
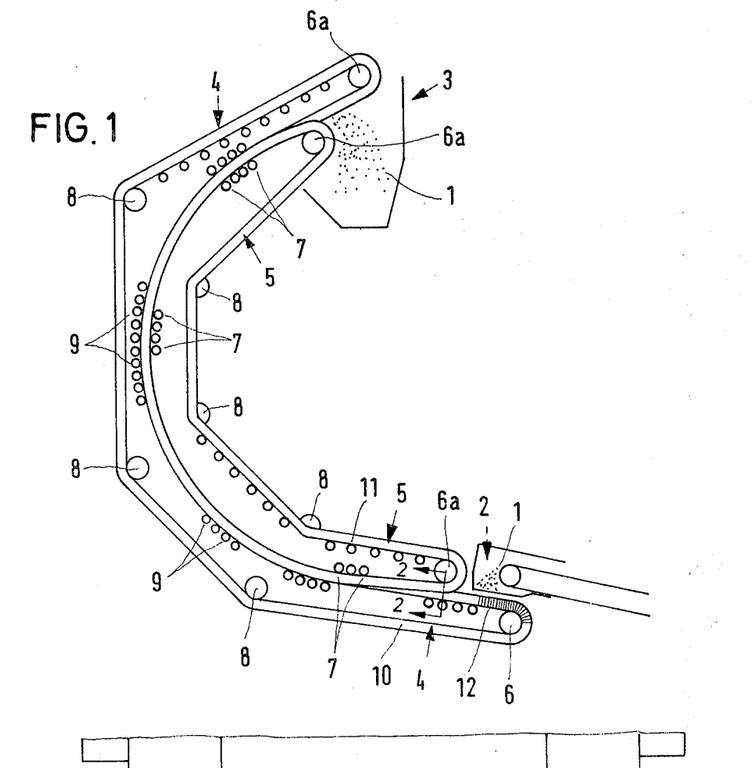
FIG. 1 is a greatly simplified lateral view of a cover belt conveyor system with C-shaped conveyor path.

In FIG. 1 a cover belt conveyor system with a C-shaped conveyor path is shown which is used for overhead transportation of dusty bulk material 1 from a loading station 2 to an unloading station 3 located above the loading station. The transport is made by means of two conveyor belts 4 and 5 moving at the same speed around return drums 6, their forward runs moving over straight support drums 7 and their return runs over deflecting drums 8.

At the loading station 2, the lower conveyor belt 4 serves as the carrier belt upon which the conveyor belt 5 is placed as cover belt, downstream of the loading station. The two conveyor belts which are thus joined in their forward runs move in parallel along the evenly curved conveyor path defined by the support drums 7, until they reach the unloading station 3 where they are separated from each other. In the course of the conveyor path, in the vertical section, the functions of the two conveyor belts 4 and 5 are exchanged. Above the vertical section, the cover belt 5 adopts the carrying function and the carrier belt 4 the covering function.

Further support or pressure drums 9 in the conveying path contacted by the forward run of the carrier belt 4 are only provided for in the case of a very high conveying speed to assist in supporting the carrier belt against the then very high centrifugal forces.

Figure 2:
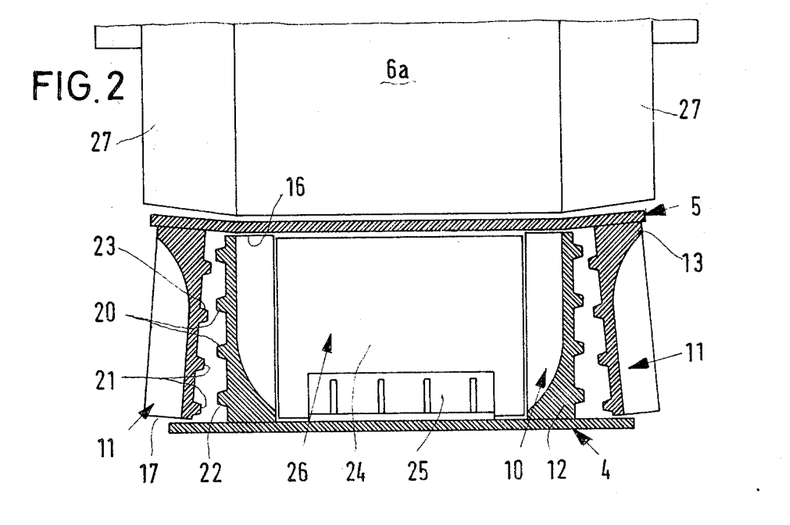
FIG. 2 is a sectional elevation along line 2—2 of FIG. 1.

The conveyor belts 4 and 5 are formed in substantially flat or planar shape and are each provided with two closure strips in the form of lateral corrugated edges or waved ridges 10 and 11, respectively. Each belt defines a belt plane. Each of the closure strips projects almost vertically from a marginal area of a respective conveyor belt. All four of them have the same height, as shown in FIG. 2. With both conveyor belts 4 and 5, the waved ridges 10 and 11 are each disposed symmetrically with respect to the longitudinal center line or axis of the respective conveyor belt. In transverse direction, the waved ridges 10 of one belt 4 are spaced at a smaller distance from each other than the waved ridges 11 of the other belt 5, such that a small transverse spacing remains free between adjacent waved ridges 10 and 11. The closure strips 10 and 11 which are all of the same design are connected to their respective conveyor belt at a base portion by a foot 12 or 13, respectively. Between the closure strips are entrainment bars 24 which have the same height as the waved ridges 10 or 11 and are each mounted on the conveyor belt 4 by means of a foot 25. The entrainment bars 24 subdivide the box-shaped conveyor space 26 defined between the two conveyor belts 4 and 5 into individual longitudinal portions.

Figure 3:
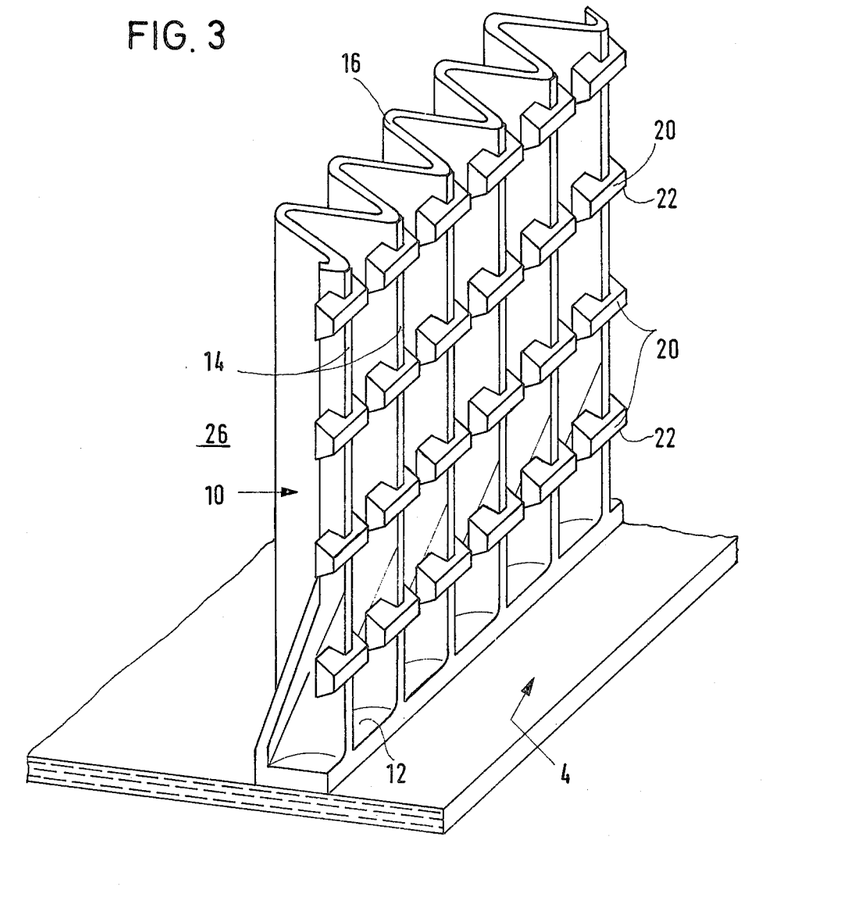
FIG. 3 is an isometric view of a piece of a conveyor belt on which a waved ridge is attached and which is destined for the cover belt conveyor system according to FIG. 1.

FIG. 3 shows details of the outer sides, with respect to the conveyor space 26, of the two closure strips 10 on the carrier belt 4. As shown, the strip has four rows of profile knobs 20 in parallel with the conveyor belt, the profile knobs being vulcanized integrally with the waved ridge. The profile knobs are positioned on top of one another at the individual wave crests 14 of the waved ridge and project laterally from a profile portion of the closure strip, having a height of approximately 20 mm, as measured from the wave crest. Each profile knob has the shape of an obelisk, i.e. of a body having a trapezoidal cross section and a rectangular base which extends parallel to the longitudinal direction of the conveyor belt and vertically to the plane of the conveyor belt, the longer side being oriented in longitudinal direction of the conveyor belt and the smaller rectangular area being located on the outside. Thus the profile knobs have plane undersides 22 which are parallel to the longitudinal direction of the conveyor belt and form an obtuse angle with the main plane of the waved ridge, in accordance with the trapezoidal cross section. All undersides of the profile knobs in one row lie in the same plane. Each profile knob is connected with the waved ridge such that it extends, symmetrically at both sides of its wave crest 14, a little into the depth of the waved ridge and the wave crest extends approximately through the middle of the obelisk-shaped profile knob as such.

The length of the profile knobs in longitudinal direction of the conveyor belt corresponds to between 57 and 60% of the spacing between wave crests or periodicity of the waved ridge. Thus the spacings between the front faces of the profile knobs are smaller than their length. In vertical direction the spacing between rows of profile knobs is always the same, e.g. 100 mm. The lowest row has approximately the same distance from the belt plane of the conveyor belt 4, while the top row clearly is spaced less from the tip or head 16 of the closure strip. All profile knobs may be rounded off, although not so shown in the drawing for the sake of better clarity. The portion of the closure strip adjacent the profile portion and spaced from the base portion is here referred to as a tip portion.

The waved ridges 11 of the cover belt 5 are identical, as regards the design and arrangement of their profile knobs 21, with the waved ridges 10 of the carrier belt. However, they are positioned on the cover belt 5 with their sides exchanged, i.e. that the outer side of the waved ridge on the carrier belt is the inner side of the waved ridge of the cover belt, see FIG. 2.

The return drum 6a of the cover belt 5 at the loading station is conically tapered outwardly in its marginal zones 27 at either side. The angle of inclination formed between the conically tapering areas and the drum axis is about 5 degrees. As a consequence, the cover belt 5 moving around the return drum 6a bends or becomes depressed negatively at its edges because it conforms to the conically tapering marginal zones along its edges by virtue of the tension in the belt (FIG. 2). This causes the waved ridges to tilt laterally toward the outside, whereby an unobstructed "slipping over" of the cover belt over the carrier belt filled with material to be conveyed is rendered possible. As the distance from the return drum increases, the cover belt 5 turns back into plane position so that its waved ridges become gradually more vertically aligned and let their profile knobs 21 enter into meshing engagement with the profile knobs 20 at the carrier belt. Proper selection of the distances of the upper row of profile knobs from the head of the waved ridge and of the lower row of profile knobs from the respective conveyor belt guarantees that the profile knobs 20 and 21 contact each other by their undersides 22 and 23, respectively. In locked condition of pairs of waved ridges they prevent the tips 16 and 17 of the closure strips 10 and 11, respectively, from lifting off from the adjacent conveyor belt 5 or 4, respectively. In the course of the conveyor path the cover belt 5, between its waved ridges 11, thus rests firmly on the head 16 of the waved ridge 10, while the head 17 of the waved ridge 11 is placed firmly on the marginal areas of the carrier belt 4 outside of the waved ridges 10. In this manner a boxshaped conveyor space 26 is formed in the course of the conveyor path and is held absolutely tightly closed by the interengagement of the profile knobs 20 and 21. Bending or negative depression of the conveyor belt 5 at the level of the unloading station disengages the profile knobs of the waved ridges so that the two conveyor belts 4 and 5 can be separated and the material conveyed can be discharged at the unloading station 3. As the waved ridges 11 of the conveyor belt 5 extend upwardly upstream of the dumping location, the lateral tilting movement of the waved ridges 11 for opening is enhanced by their own weight.

Figure 4:
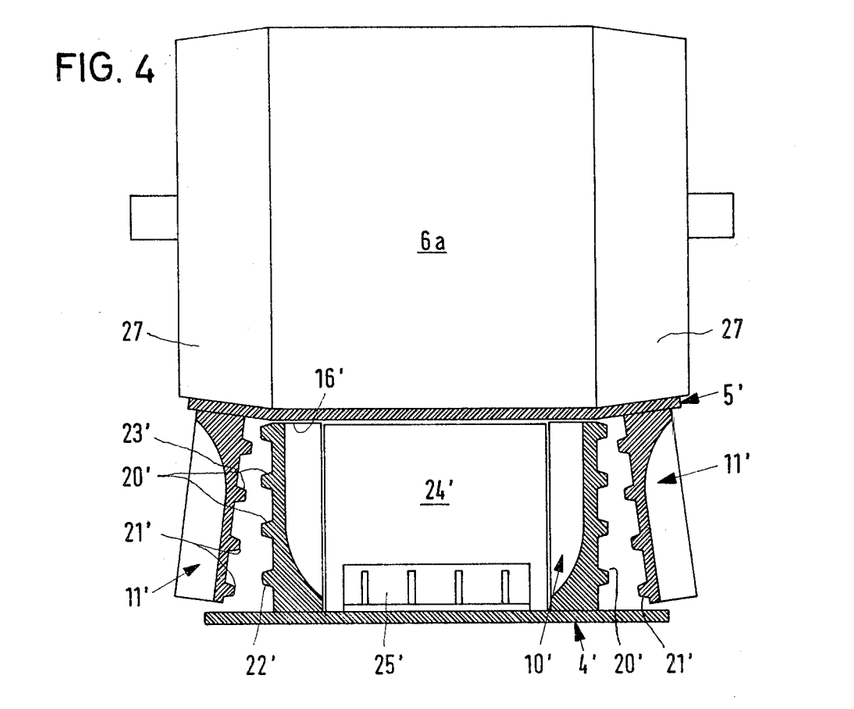
FIG. 4 is a view similar to FIG. 2, showing a modified arrangement of the profile knobs at the waved ridges of the conveyor belts.
Figure 5:
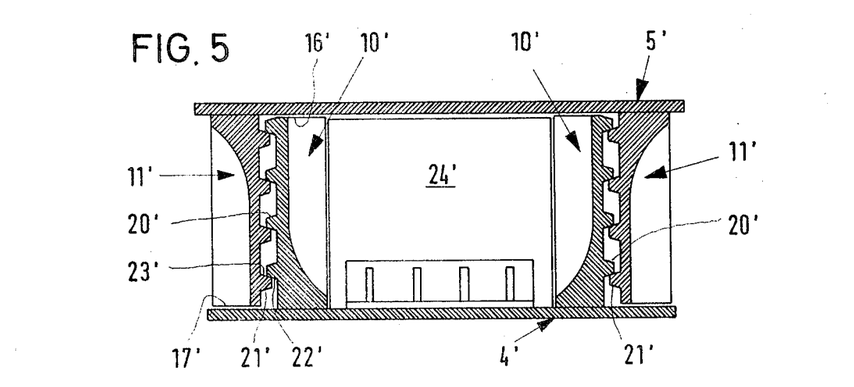
FIG. 5 is a cross sectional view of the two conveyor belts according to FIG. 4, showing the waved ridges in locked conditions.

FIGS. 4 and 5 demonstrate the conditions described with respect to two conveyor belts 4' and 5', whose profile knobs 20' and 21' are not provided in absolutely identical arrangement. Rather, the top row of the profile knobs 20' of carrier belt 4' is located directly at the head 16' of the waved ridge 10' and, with both conveyor belts joined, it touches the cover belt 5', whereby the engagement is improved. The arrangement of the rows of profile knobs 21' at the waved ridges 11' of the cover belt 5' is so adapted that the profile knobs again enter into engagement at their undersides 22' and 23', as shown in FIG. 5.

Figure 6:
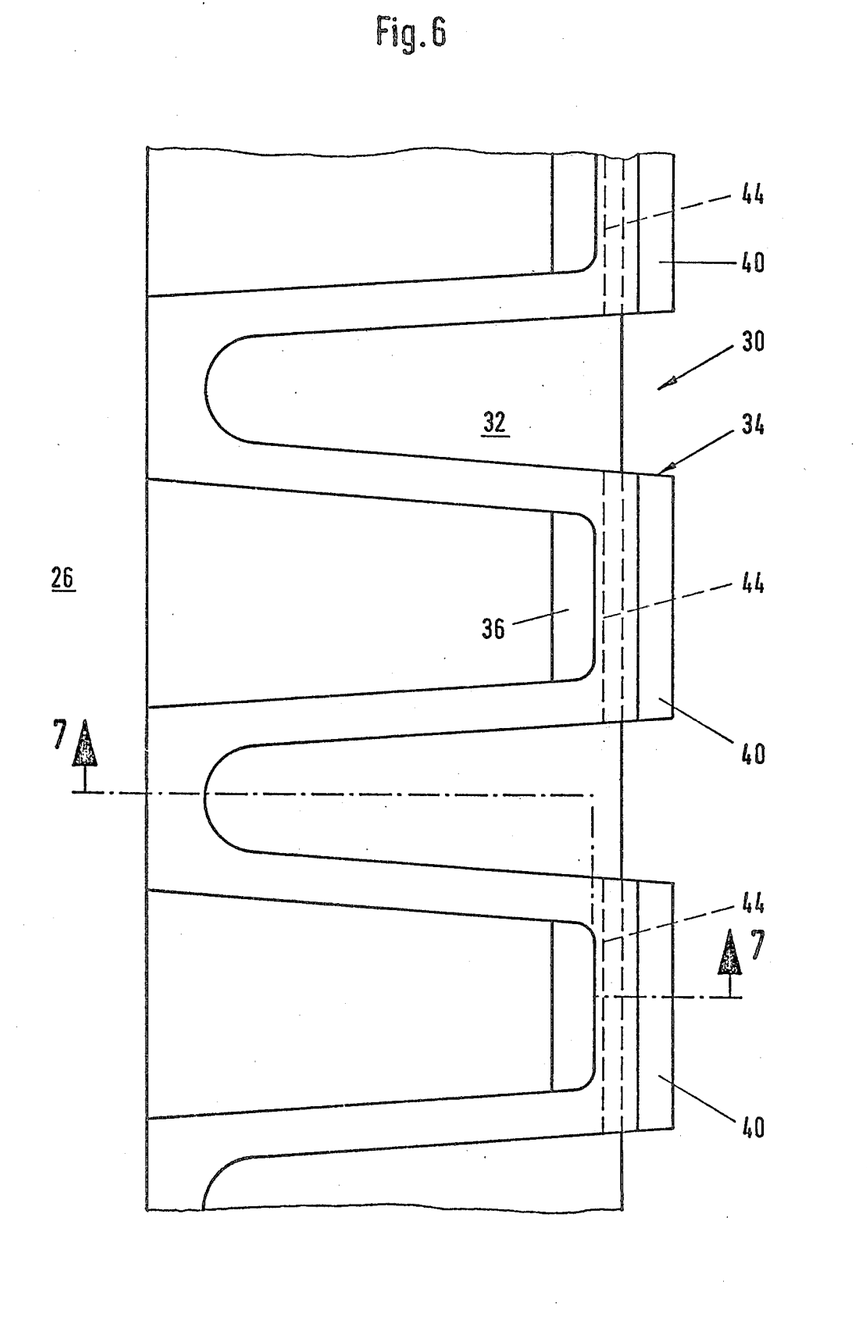
FIG. 6 is an enlarged plan view of a marginal side edge portion of a conveyor belt embodying a modified form of this invention.
Figure 7:
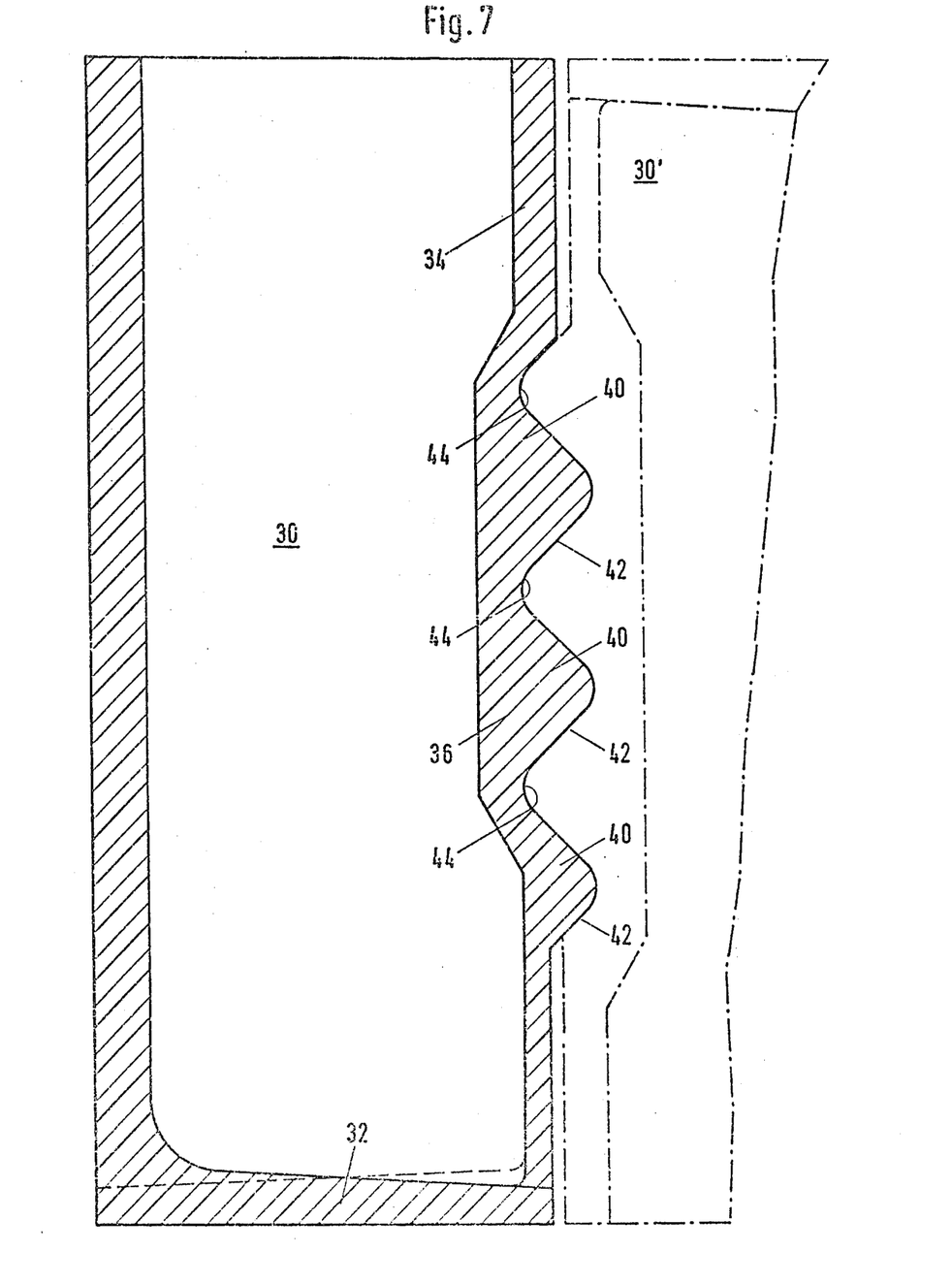
FIG. 7 is a sectional view taken along the line 7—7 in FIG. 6 and showing the interengagement of marginal side edge portions of two conveyor belts.

FIGS. 6 and 7 show a form of the present invention in which the contact surfaces of the profile portion of the closure strips engage over a greater area. As there shown, the profile portion 40 includes convex portions 42 and concave portions 44. Those portions together define, in a plane perpendicular to both the longitudinal axis and the belt plane of the belt, a curve of periodic wave form (FIG. 7). The particular wave form shown in sinusoidal. Where two such closure strips engage one another in accordance with this invention, as indicated in FIG. 7, the respective convex-concave and concave-convex surfaces may be said to mate one with another.

As will be appreciated, the mating engagement of conveyor belts of this form of the invention is quite secure and firm. In order to facilitate engagement and disengagement of belts having the characteristics now described, the tip portion of the waved ridges or closure strips has a greater flexibility than the base portion. Such greater flexibility, achieved for example by having thinner walls in the tip portion, make it more readily possible to open or spread the closure strips for engagement and disengagement of the belts.

In the drawings and specification, there has been set forth a preferred embodiment of the invention, and although specific terms are employed, they are used in a generic and descriptive sense only and not for purposes of limitation.

That which is claimed is:

1. In a cover belt conveyor adaptable for use in conveying material from one level to another level and including a carrier belt and a cover belt entrained over respective return drums and having proximal runs defining a conveyor path therebetween, said belts defining proximal surfaces along said runs and extending in spaced apart substantially parallel relationship along the conveyor path, each belt also having opposite side edges thereon, and two longitudinally extending closure strips of flexible material, such as rubber or the like, projecting from the proximal surface of each belt adjacent the respective side edges thereof, the closure strips being so positioned that the closure strips of one belt fit between the cover closure strips of the other belt to form a closed box-shaped conveyor space between the proximal runs of the belts, the improvement comprising said closure strips of both belts having a periodic wave form defining wave ridges thereon which project substantially perpendicularly from said proximal surfaces of the respective belts with all of said closure strips projecting approximately the same extent from said proximal surfaces of the respective belts, each of said one belt closure strips being offset inwardly from the respective other belt closure strip adjacent the respective side edge of said other belt so that said one belt closure strips are spaced inwardly a relatively small extent from the respective other belt closure strips in the conveyor path, and profile knobs carried by each closure strip and projecting from the wave ridges thereof, certain of said profile knobs being located on the outer sides of said one belt closure strips, and certain others of said profile knobs being located on the inner sides of said other belt closure strips, said profile knobs being arranged in longitudinal rows extending substantially parallel with said belts and having contact surfaces thereon extending substantially parallel to the longitudinal axis of the respective belt and facing toward the proximal surfaces of the one belt and the other belt, respectively, so that said contact surfaces of adjacent rows of profile knobs on adjacent one belt closure strips and cover belt closure strips will contact each other to aid in maintaining the closure strips of the one belt in the desired relation to said other belt closure strips along said conveyor path.

2. A cover belt conveyor according to claim 1 wherein said profile knobs are integral with the wave ridges of the respective closure strips.

3. A cover belt conveyor according to claim 1 wherein the contact surface of each profile knob is substantially flat.

4. A cover belt conveyor according to claim 1 wherein each profile knob is of generally obelisk shape.

5. A cover belt conveyor according to claim 1 wherein each closure strip is provided with a plurality of said rows of profile knobs thereon extending in substantially parallel relationship.

6. A cover belt conveyor according to claim 5 wherein the distance between the centers of immediately adjacent rows of said profile knobs is about 100 mm, and wherein each profile knob projects outwardly about 20 mm from the crests of the respective wave ridges.

7. In a conveyor belt adaptable for use in a cover belt system conveying material from one level to another level and including a carrier belt and a cover belt entrained over respective return drums and extending in spaced apart substantially parallel relationship along proximal runs defining proximal surfaces along a conveyor path therebetween, the belt having opposite side edges and two longitudinally extending closure strips of flexible material, such as rubber or the like, projecting from the proximal surface thereof adjacent the respective side edges thereof with the closure strips being so positioned that the closure strips of the belt will engage with the closure strips of another belt to form a closed box-shaped conveyor space between the proximal runs of the belts, and improvement comprising said closure strips having a periodic wave form defining wave ridges thereon which project substantially perpendicularly from said proximal surfaces of said belt, and profile knobs carried by each closure strip and projecting from wave ridges thereof, said profile knobs being arranged in longitudinal rows extending substantially parallel with said belt and having contact surfaces thereon facing in one of the directions of outwardly and inwardly toward the proximal surfaces of said belt, so that said contact surfaces of adjacent rows of profile knobs on adjacent closure strips in said system will contact each other to aid in maintaining the closure strips in the desired relation along said conveyor path.

* * * * *

UNITED STATES PATENT AND TRADEMARK OFFICE
CERTIFICATE OF CORRECTION

PATENT NO. : 4,425,995

DATED : January 17, 1984

INVENTOR(S) : Karl-Gunther Blattermann, Gunter Neuhaus and Gunther Nolte

It is certified that error appears in the above-identified patent and that said Letters Patent is hereby corrected as shown below:

Cover page, listing of inventors, "Guther Nolte" should be -- Gunther Nolte --.

Cover page, Notice, the date "Jun. 16, 1995" should be -- Jun. 16, 1998 --.

Signed and Sealed this

Eighth Day of May 1984

[SEAL]

Attest:

GERALD J. MOSSINGHOFF

Attesting Officer

Commissioner of Patents and Trademarks